(12) United States Patent
Plaver et al.

(10) Patent No.: US 6,429,260 B1
(45) Date of Patent: Aug. 6, 2002

(54) OLEFINIC POLYMER COMPOSITIONS

(75) Inventors: F. Michael Plaver; Charles A. Berglund; Sarada Namhata, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/793,321

(22) Filed: Feb. 26, 2001

Related U.S. Application Data

(63) Continuation-in-part of application No. 09/583,623, filed on May 31, 2000.

(51) Int. Cl.⁷ .................. C08L 23/10; C08F 293/00
(52) U.S. Cl. ................ 525/98; 525/99; 525/192; 525/240; 525/241
(58) Field of Search ............... 525/98, 99, 192, 525/240, 241

(56) References Cited

U.S. PATENT DOCUMENTS

| | | |
|---|---|---|
| 4,356,066 A | 10/1982 | Kienle et al. |
| 4,880,514 A | 11/1989 | Scott et al. |
| 4,965,114 A | 10/1990 | Ikeda et al. |
| 5,189,110 A | 2/1993 | Ikematu et al. |
| 5,191,024 A | 3/1993 | Shibata et al. |
| 5,219,940 A | 6/1993 | Nakano |
| 5,234,792 A | 8/1993 | Koyama et al. |
| 5,306,779 A | 4/1994 | Shibata et al. |
| 5,310,817 A | 5/1994 | Hergenrother et al. |
| 5,635,114 A | 6/1997 | Hong |
| 5,828,043 A | 10/1998 | Nicoll et al. |
| 5,861,463 A | 1/1999 | Sehanobish et al. |
| 5,955,021 A | 9/1999 | Tiffany, III |
| 6,025,054 A | 2/2000 | Tiffany, III |

FOREIGN PATENT DOCUMENTS

| | | |
|---|---|---|
| CA | 805219 | 1/1969 |
| EP | 505110 | 8/1996 |
| EP | 726291 | 8/1996 |
| EP | 892393 | 1/1999 |
| JP | 3234741 | 11/1989 |
| JP | 5271482 | 10/1993 |
| JP | 9118812 | 5/1997 |
| JP | 2725402 | 12/1997 |
| JP | 3115349 | 12/1997 |
| JP | 11286526 | 10/1999 |
| WO | WO99/23649 | 5/1999 |
| WO | WO99/23650 | 5/1999 |
| WO | WO99/23652 | 5/1999 |
| WO | WO00/77095 | 12/2000 |

*Primary Examiner*—Jeffrey Mullis

(57) ABSTRACT

The present invention relates to a composition comprising:
  A) a polyolefin thermoplastic,
  B) a hydrogenated block copolymer of a vinyl aromatic and conjugated diene monomer having a level of aromatic hydrogenation of at least 70 percent, and
  C) at least one linear or substantially linear ethylene/α-olefin polymer.

13 Claims, No Drawings

OLEFINIC POLYMER COMPOSITIONS

This application is a continuation-in-part of U.S. Ser. No. 09/583,623, filed May 31, 2000.

The present invention is directed to compositions of olefinic polymers.

In particular, the present invention is directed to compositions of olefinic polymers with hydrogenated aromatic polymers.

BACKGROUND OF THE INVENTION

Polyolefins, such as polypropylene, have been used in a variety of applications which require good stiffness and flow properties. However, modifications to the polyolefin composition have been required in order to overcome various disadvantages such as impact resistance, stress whitening, heat resistance, dimensional stability, and mold shrinkage. Other polymers have been blended with polyolefins to try to improve such properties.

Many different polymers and materials have been added to polyolefins to enhance the impact strength of the overall composition. For example, U.S. Pat. No. 5,118,753 (Hikasa et. al.), incorporated herein by reference, discloses thermoplastic elastomer compositions said to have low hardness and excellent flexibility and mechanical properties, consisting essentially of a mixture of an oil-extended olefinic copolyer rubber and an oletinic plastic, such as propylene. Modern Plastics Encyclopedia/89 mid Oct. 1988 Issue, Volume 65, Number 11, pp. 110–117, also discusses the use of various thermoplastic elastomers (TPEs) useful for impact modification, including elastomeric alloys TPEs engineering TPEs, olefinic TPEs (also known as thermoplastic olefins or TPOs), polyurethane TPEs and styrenic TPEs.

Thermoplastic olefins (TPOs) are generally produced from compositions of an elastomeric material such as ethylene/propylene rubber (EPM) or ethylene/propylene diene monomer terpolymer (EPDM) and a more rigid material such as isotactic polypropylene.

Flexomer™ Polyolefins by Union Carbide were introduced to replace expensive EPM or EPDM rubbers. These new polyolefins are said to have bridged the gap between rubbers and polyethylene, having moduli between the two ranges. However, according to the data contained in FIG. 4 of the paper "Flexomer™ Polyolefins: A Bridge Between Polyethylene and Rubbers" by M. R. Rifi, H. K. Ficker and M. A. Corwin, more of the Flexomer™ Polyolefin needs to be added into the TPO formulation in order to reach the same levels of low temperature Gardner Impact performance as the standard EPM rubber, thus somewhat negating the benefits of the lower cost EPM/EPDM replacement.

In a paper presented on Sep. 24, 1991 at the 1991 Specialty Polyolefins Conference (SPO '91) (pp. 43–55) in Houston, Tex., Michael P. Jeffries (Exxpol Ethylene Polymers Venture Manager of Exxon Chemical Company) also reports that Exxon's Exact™ polymers and Plastomers can be blended into polypropylene for impact modification. Exxon Chemical Company, in the Preprints of Polyolefins VII International Conference, page 45–66. Feb. 24–27 1991, also disclose that the narrow molecular weight distribution (NMWD) resins produced by their EXXPOL™ technology have higher melt viscosity and lower melt strength than conventional Ziegler resins at the same melt index. In another recent publication, Exxon Chemical Company has also taught that NMWD polymers made using a single site catalyst create the potential for melt fracture ("New Specialty Linear Polymers (SLP) For Power Cables," by Monica Hendewerk and Lawrence Spenadel, presented at IEEE meeting in Dallas, Tex., Sep., 1991).

It is well known that narrow molecular weight distribution linear polymers disadvantageously have low shear sensitivity or low $I_{10}/I_2$ value, which limits the extrudability of such polymers. Additionally, such polymers possessed low melt elasticity, causing problems in melt fabrication such as film forming processes or blow molding processes (e.g., sustaining a bubble in the blown film process, or sag in the blow molding process etc.). Finally, such resins also experienced surface melt fracture properties at relatively low extrusion rates thereby processing unacceptably and causing surface irregularities in the finished product.

Thus, while the development of new lower modulus polymers has aided the TPO marketplace, there continues to be a need for other more advanced, cost-effective polymers for compounding into polypropylene which improve or maintain low temperature impact performance and modulus.

In addition, compatibility of added polymers with the polyolefin is a potential problem. Hivalloy· by Montell attempts to expand the performance window of polyolefin blends, wherein polypropylene is grafted with a functional group to aid in compatibility of the two polymers. However, grafting is an additional step, adding cost to the process.

Vinylcyclohexane polymers have also been previously combined with polyolefins such as polypropylene. The use of crystalline vinyl cyclohexane polymer as a nucleating agent for the crystallization of polypropylene is known in the art. However, the amount of vinyl cyclohexane polymer is not more than 0.1 weight percent and does not significantly enhance the properties of the polypropylene. JP-5271482, assigned to Mitsubishi Kasei, discloses a blend of a crystalline polyolefin, such as polypropylene and an amorphous polyvinylcyclohexane type resin in ratios of 95/5 to 5/95. However, the composition still suffers from insufficient impact properties.

Therefore, there remains a need for a polyolefin composition, particularly a polypropylene composition having improved balance of flow, modulus and impact resistance properties which is cost effective and efficient, without the disadvantages of the prior art.

SUMMARY OF THE INVENTION

Polyolefin compositions have now been produced, having a combination of good low temperature impact performance and modulus, wherein the composition comprises:

A) a polyolefin thermoplastic,

B) a hydrogenated block copolymer of a vinyl aromatic and conjugated diene monomer having a level of aromatic hydrogenation of at least 70 percent, and C) at least one linear or substantially linear ethylene/α-olefin polymer, This composition offers improved flow, stiffness and impact resistance property balance over olefinic polymer compositions of the art.

DETAILED DESCRIPTION OF THE INVENTION

The polyolefin thermoplastic can be any polyolefin homopolymer or copolymer including, but not limited to, polyethylene, polypropylene, and the like. In one embodiment, the polyolefin is a propylene homopolymper. Polypropylene homopolymer is generally in the isotactic form, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7% ethylene copolymerized with the propylene), however, can also be used in the compositions disclosed herein. Such copolymers typically contain from 5 to 20 percent ethylene and from 80 to 95 percent propylene and have a melt flow rate (at 230° C./2.16 kg) ranging from 0.5 to 100 g/10 minutes. Mixtures or combinations of the homopolymers and copolymers described above can also be used. A complete discussion of various polypropylene polymers is contained in Modern Plastics Encyclopedia/89, mid Oct. 1988 Issue, Volume 65, Number 11, pp. 86–92. The molecular weight of the polypropylene for use in the present invention is conveniently indicated using a melt flow measurement according to ASTM D-1238, Condition 230° C/2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 100 g/10 min, preferably from about 0.5 g/10 min to about 70 g/10 min, and especially from about 1 g/10 min to about 50 g/10 min.

The amount of polyolefin in the composition of the present invention is typically from 30, preferably from 35 and most preferably from 40 to 75, preferably to 70, and most preferably to 60 weight percent based on the total weight of the polymer composition.

The composition also comprises a hydrogenated block copolymer of an aromatic monomer and a conjugated diene monomer. In one embodiment, the aromatic monomer is of the formula:

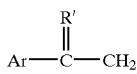

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, cyano, carbonyl and carboxyl. More preferably Ar is phenyl or alkyl phenyl with phenyl being most preferred. Typical vinyl aromatic monomers which can be used to produce such aromatic polymers include styrene, alpha-methylatyrene, all isomers of vinyl toluene, especially paravinyltoluene, all isomers of ethyl styrene, propyl styrene, vinyl biphenyl, vinyl naphthalene, vinyl anthracene and the like, and mixtures thereof. Homopolymers may have any stereostructure including syndiotactic, isotactic or atactic; however, atactic polymers are preferred. Hydrogenated copolymers derived from these aromatic monomers, including random, pseudo random, block and grafted copolymers, may be used in the process of the present invention.

The conjugated diene monomer can be any monomer having 2 conjugated double bonds. Such monomers include for example 1,3- butadiene, 2-methyl-1,3-butadiene, 2-methyl-1,3 pentadiene, isoprene and similar compounds, and mixtures thereof. The block copolymer can contain more than one specific polymerized conjugated diene monomer. In other words, the block copolymer can contain a polybutadiere block and a polyisoprene block. Further examples of block copolymers may be found in U.S. Pat. Nos. 4,845,173, 4,096,203, 4,200,718, 4,210,729, 4,205,016, 3,652,516, 3,734,973, 3,390,207, 3,231,635, and 3,030,346.

In one embodiment, the hydrogenated polymer is a hydrogenated vinyl aromatic-conjugated diene block copolymer, wherein the conjugated diene polymer block is chosen from materials which remain amorphous after the hydrogenation process, or materials which are capable of crystallization after hydrogenation. Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. The conjugated diene polymer block may also be a copolymer of a conjugated diene, wherein the conjugated diene portion of the copolymer is at least 50 weight percent of the copolymer.

The hydrogenated block copolymers may be rigid, flexible or elastomeric, depending on the relative volumes of hydrogenated conjugated diene polymer and hydrogenated vinyl aromatic polymer block components.

In one embodiment, the hydrogenated block copolymer is rigid and typically has a weight ratio of hydrogenated conjugated diene polymer block to hydrogenated vinyl aromatic polymer block of 40:60 or less, generally from 40:60 to 5:95, preferably from 35:65 to 10:90, more preferably from 30:70 to 15:85, based on the total weight of the hydrogenated conjugated diene polymer block and the hydrogenated vinyl aromatic polymer block. The total weights of the hydrogenated vinyl aromatic polymer blocks and the hydrogenated conjugated dione polymer block(s) is typically at least 80 weight percent, preferably at least 90, and more preferably at least 95 weight percent of the total weight of the hydrogenated copolymer.

In another embodiment, the hydrogenated block copolymer is flexible or elastomeric and is defined as having a weight ratio of hydrogenated conjugated diene polymer block to hydrogenated vinyl aromatic polymer block of greater than 40:60; typically of greater than 40:60 to 95:5, preferably from 45:55 to 90:10, more preferably from 50:50 to 85:15 and most preferably from 60:40 to 80:20, based on the total weight of the hydrogenated conjugated diene and hydrogenated vinyl aromatic polymer blocks. The total weights of the hydrogenated vinyl aromatic polymer blocks and the hydrogenated conjugated diene polymer block(s) is typically at least 80 weight percent, preferably at least 90, and more preferably at least 95 weight percent of the total weight of the hydrogenated copolymer.

Hydrogenated block copolymers are produced by the hydrogenation of block copolymers including diblock, triblock, multiblock, tapered block, and star block copolymers such as SB, SBS, SBSBS, SI, SIS, SISIS, SISBS and the like (wherein S is polystyrene, B is polybutadiene and I is polyisoprene). The block copolymers typically contain at least one triblock segment comprised of a vinyl aromatic polymer block on each end. The block copolymers may, however, contain any number of additional blocks, wherein these blocks may be attached at any point to the triblock polymer backbone. Thus, linear blocks would include for example SB, SBS, SBSB, SBSBS, SBSBSB, and the like. The copolymer can also be branched, wherein polymer chains are attached at any point along the copolymer backbone.

The total number average molecular weight ($Mn_t$) of the hydrogenated block copolymers used in the present invention will depend upon the actual polymer used. The Mn of rigid polymers is generally from 24,000, typically from 30,000, preferably from 40,000, more preferably from 45,000 and most preferably from 50,000 to 120,000, typically to 100,000, generally to 95,000, preferably to 90,000, more preferably to 85,000, and most preferably to 80,000. Number average molecular weight (Mn) as referred to throughout this application is determined using gel permeation chromatography (GPC). The molecular weight of the hydrogenated block copolymer and properties obtained are dependent upon the molecular weight of each of the hydrogenated polymeric blocks. It has been discovered that by optimizing the molecular weight of the hydrogenated polymeric blocks, hydrogenated block copolymers of low molecular weight can achieve high heat distortion temperatures and excellent toughness and tensile strength properties. Surprisingly, we have found that good physical properties can be obtained at relatively low hydrogenated block copolymer molecular weights which gives superior processability.

Typical number average molecular weight values ($Mn_a$) for each hydrogenated vinyl aromatic polymer block of a rigid polymer are from 5,000, preferably from 10,000, more preferably from 13,000 and most preferably from 15,000 to 50,000, preferably to 45,000, more preferably to 40,000 and most preferably to 35,000. The hydrogenated diene polymer block of a rigid polymer will generally have a molecular weight ($Mn_b$) of from 2,500, typically from 3,000, advantageously from 3,500, more advantageously from 4,000, preferably from 8,000, more preferably from 10,000, and most preferably from 12,000 to 30,000, preferably to 28,000, most preferably to 25,000 and most preferably to 22,000.

The total number average molecular weight (Mn) of the flexible hydrogenated block copolymers used in the present invention is typically from 30,000, preferably from 45,000, more preferably from 55,000 and most preferably from 60,000 to 150,000, typically to 140,000, generally to 135,000, preferably to 130,000, more preferably to 125,000, and most preferably to 120,000. The Mn, as referred to throughout the specification, is determined using gel permeation chromatography (GPC). The molecular weight of the hydrogenated block copolymer and properties obtained are dependent upon the molecular weight of each of the hydrogenated polymeric blocks.

The flexible hydrogenated block copolymers will typically have hydrogenated vinyl aromatic polymer block Mn's of from 6,000, preferably from 9,000, more preferably from 11,000, and most preferably from 12,000 to 45,000, preferably to 35,000, more preferably to 25,000 and most preferably to 20,000. The flexible hydrogenated diene polymer block will typically be from 12,000, preferably from 27,000, more preferably from 33,000 and most preferably from 36,000 to 110,000, preferably to 100,000, more preferably to 90,000 and most preferably to 80,000.

It should be noted that good properties are obtained at hydrogenated vinyl aromatic polymer molecular weights which are lower than the entanglement molecular weight of the hydrogenated vinyl aromatic polymer. The entanglement molecular weight of a polymer is associated with the chain length required for a given polymer to show a dramatic increase in melt viscosity due to chain entanglements. The entanglement molecular weights for many common polymers have been measured and reported in *Macromolecules*, 1994, Volume 27, page 4639. It is commonly observed for glassy polymers that maximum values of strength and toughness are achieved at about 10 times the entanglement molecular weight (see for instance Styrene Polymers in the Encyclopedia of Polymer Science and Engineering, 2nd edition, Volume 16, pages 62–71, 1989). The entanglement molecular weight is approximately 38,000 for polyvinylcyclohexane. We have determined that an optimum balance of properties and processability can be obtained at hydrogenated vinyl aromatic polymer block molecular weights ($Mn_a$) of 0.2 to 1.2 times the entanglement molecular weight of a hydrogenated vinyl aromatic polymer. In general, the optimum $Mn_a$ for a hydrogenated polystyrene block in the hydrogenated block copolymer of the present invention is from 7,000 to 45,000.

It is important to note that each individual block of the hydrogenated block copolymer of the present invention, can have its own distinct Mn. In other words, for example, two hydrogenated vinyl aromatic polymer blocks within the hydrogenated block copolymer may each have a different Mn.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers- Designer Soft Materials", PHYSICS TODAY, Feb., 1999, pages 32–38.

In a preferred embodiment, the hydrogenated block copolymer has a Mn of from 30,000 to 120,000, a hydrogenated vinyl aromatic block content of from 20 to 90 weight percent based on the total weight of the copolymer, and a 1,2 diene content of from 5 to 20 weight percent.

Methods of making block copolymers are well known in the art. Typically, block copolymers are made by anionic polymerization, examples of which are cited in *Anionic Polymerization: Principles and Practical Applications*, H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, a pentablock copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. The coupled structure achieved by this method is considered to be the functional equivalent of the ABABA pentablock copolymer structure. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S Pat. Nos. 4,200,718 and 4,196,154 which are herein incorporated by reference.

The hydrogenated block copolymers which are especially preferred for use in the present invention include any block copolymer as described above, which has been hydrogenated to a level of at least 70 percent aromatic hydrogenation, generally at least 75 percent, typically at least 80 percent, advantageously at least 90 percent, more advantageously at least 95 percent, preferably at least 98 percent, more preferably at least 99.5 percent, and most preferably at least 99.8 percent. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

Methods of hydrogenating aromatic polymers are well known in the art such as that described in U.S. Pat. No. 5,700,978 by Hahn and Hucul, herein incorporated by reference, wherein aromatic polymers are hydrogenated by contacting the aromatic polymer with a hydrogenating agent in the presence of a silica supported metal hydrogenation catalyst having a narrow pore size distribution and large pores. The level of hydrogenation in hydrogenated vinyl aromatic polymers can be determined using UV·AVIS spectrophotometry. If a diene copolymer is used, the level of hydrogenation in hydrogenated diene polymers is determined using proton NMR.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 $m^2/g$ and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., The Chemistry of Silica, John Wiley and Sons. 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. X., The Chemistry of Silica, John Wiley and sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in Studies in Surface Science and Catalysis, "Successful Design of Catalysts" V. 44, pg. 146–158, 1989 and Applied Heterogeneous Catalysis pgs. 75–123. Institute Frangais du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organametallic compounds or covalent complexes.

Typically, the total metal content of the mixed supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction, though their use is not preferred.

The amount of mixed supported catalyst used in the hydrogenation process is much smaller than the amount required in conventional unsaturated polymer hydrogenation reactions due to the high reactivity of the hydrogenation catalysts. Generally. amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C..

The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include but are not limited to hydrogen gas, hydrazine and sodium borohydride. In a preferred embodiment, the hydrogenating agent is hydrogen gas.

The amount of hydrogenated block copolymer useful in the polymer composition of the present invention is generally from 1, typically from 2, preferably from 5, more preferably from 10 and most preferably from 15 to 45, preferably to 40, and most preferably to 35 weight percent, based on the total weight of the polymer composition. It should also be noted that when using flexible or elastomeric hydrogenated block copolymers. amounts of greater than 45 weight percent can be used.

The third component C) of the composition of the present invention is a rubbery or elastomeric polyolefin. Elastomeric polyolefins include any polymer comprising one or more $C_{2-20}$ α-olefins in polymerized forn, having Tg less than 25° C., preferably less than 0° C. Examples of the types of polymers from which the present elastomeric polyolefins are selected include homopolymers and copolymers of α-olefins, such as ethylene/propylene, ethylene/1- butene, ethylene/1-hexene or ethylene/1-octene copolymers, and terpolymers of ethylene, propylene and a comonomer such as hexadiene or ethylidenenorbornene. Grafted derivatives of the foregoing rubbery polymers such as polystyrene-, maleic anhydride-, polymethylmethacrylate- or styrene/methyl methacrylate copolymer- grafted elastomeric polyolefins may also be used.

In one embodiment, the elastoner is a substantially linear ethylene/α-olefin polymer or copolymer such as an interpolymers of ethylene with at least one $C_3$-C20 α-olefin and/or $C_4$-$C_{18}$ diolefins as described in U.s. Pat. No. 5,681, 897, incorporated herein by reference. Copolymers of ethylene and 1-octene are especially preferred.

Other unsaturated monomers usefully copolymerized with ethylene include, for example, ethylenically unsaturated monomers, conjugated or nonconjugated dienes, polyenes, etc. Preferred comonomers include the $C_3$-$C_{20}$ α-olefins especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The substantially linear ethylene/α-olefin interpolymers described are not in the same class as traditional linear ethylene/α-olefin polymers (e.g., heterogeneously branched linear low density polyethylene, linear high density polyethylene, or homogeneously branched linear polyethylene), nor are they in the same class as traditional highly branched low density polyethylene. The substantially linear olefin polymers useful in this invention surprisingly have excellent processability, even though they have relatively narrow molecular weight distributions. Even more surprising, the melt flow ratio ($I_{10}/I_2$) of the substantially linear olefin polymers can be varied essentially independently of the polydispersity index (i.e., molecular weight distribution ($M_w$/Mn)). This is contrasted with conventional heterogeneously branched linear polyethylene resins having rheological properties such that as the polydispersity index increases, the $I_{10}/I_2$ value also increases.

The term "substantially linear≒ ethylene/α-olefin polymers means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin polymers and interpolymers useful for blending with polypropylene are those in which the comonomer is randomly distributed within a given interpolymer molecule and wherein substantially all of the interpolymer molecules have the same ethylene/comonomer ratio within that interpolymer.

Long chain branching is defined herein as a chain length of at least about 6 carbons, above which the length cannot be distinguished using $^{13}$C nuclear magnetic resonance spectroscopy.

Long chain branching is determined by using $^{13}C$ nuclear magnetic resonance (NMR) spectroscopy and is quantified using the method of Randall (*Rev. Macromol. Chem.* Phys., C29 (2&3), p. 285–297).

The density of the linear or substantially linear ethylene/ α- olefin polymers or copolymers (as measured in accordance with ASTM D- 792) for use in the present invention is generally from about 0.85 g/cm$^3$ to about 0.91 g/cm$^3$, preferably from about 0.86 g/cm$^3$ to about 0.9 g/cm$^3$, and especially from about 0.865 g/cm$^3$ to about 0.89 g/cm$^3$.

Preferred elastomeric polyolefins for use herein are such polymers that are characterized by a narrow molecular weight distribution and a uniform branching distribution. Preferred elastomeric polyolefins are linear or substantially linear ethylene interpolymers having a density from 0.85 to 0.93 g/cm$^3$, a melt index from 0.1 to 5 g/10 min, and a polydispersity of from 1.8 to 5. Such polymers are preferably those prepared using a Group 4 metal constrained geometry complex by means of a continuous solution polymerization process, such as disclosed in U.S. Pat. Nos. 5,272,236 and 5,278,272, which are hereby incorporated by reference. More preferred elastomeric polyolefins have a density of from 0.860 to 0.920 g/cm$^3$, more preferably from 0.865 to 0.915 g/cm$^3$, and especially less than or equal to 0.910 g/cm$^3$.

The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers.

While describing in the present invention a polymer or interpolymer as comprising or containing certain monomers, it is meant that such polymer or interpolymer comprises or contains polymerized therein units derived from such a monomer. For example, if the monomer in ethylene $CH_2=CH_2$, the derivative of this unit as incorporated in the polymer is —$CH_2$—$CH_2$—.

The term "linear ethylene/α-olefin polymers" means that the olefin polymer does not have long chain branching. That is, the linear ethylene/α-olefin polymer has an absence of long chain branching, as for example the linear low density polyethylene polymers or linear high density polyethylene polymers made using uniform branching (i.e., homogeneously branched) distribution polymerization processes (e.g., U.S. Pat. No. 3,645,992 (Elston), the disclosure of which is incorporated herein by reference) and are those in which the comonomer is randomly distributed within a given interpolymer molecule and wherein substantially all of the interpolymer molecules have the same ethylene/comonomer ratio within that interpolymer. The term "linear ethylene/α-olefin polymers" does not refer to high pressure branched polyethylene which is known to those skilled in the art to have numerous long chain branches. Typically, the linear ethylene/α-olefin polymer is an ethylene/α-olefin interpolymer, wherein the α-olefin is at least one $C_5$–$C_{20}$ α-olefin (e.g., 1-pentene, 4-methyl-1-pentene, 1- hexene, 1-octene and the like), preferably wherein at least one of the α-olefins is 1-octene. Most preferably, the ethylene/α-olefin interpolymer is a copolymer of ethylene and a $C_5$–C20 α-olefin, especially an ethylenel/α-octene copolymer.

The molecular weight of the linear or substantially linear ethylene/α-olefin polymers for use in the composition of the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the linear or substantially linear ethylene/α-olefin polymers useful herein is generally from about 0.01 grams/10 minutes (g/10 min) to about 20 g/l10 min, preferably from about 0.1 g/10 min to about 10 g/10 min, and especially from about 0.5 g/10 min to about 8 g/10 min.

Another measurement useful in characterizing the molecular weight of the linear or the substantially linear ethylene/α-olefin polymers is conveniently indicated using a melt index measurement according to ASTM D-1238, Condition 190° C/10 kg (formerly known as "Condition (N)" and also known as $I_{10}$). The ratio of the $I_{10}$ and the $I_2$ melt index terms is the melt flow ratio and is designated as $I_{10}/I_{12}$. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene/α-olefin polymers is preferably at least about 7, especially at least about B. The $I_{10}/I_2$ ratio of the linear ethylene/α-olefin polymers is generally about 6.

Both the linear and substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin polymers used in the present invention is preferably greater than about 30 percent, especially greater than about 50 percent. The homogeneous ethylene/α- olefin polymers used in this invention essentially lack a measurable "high density" fraction as measured by the TREF technique (i.e., the homogeneous ethylene/α-olefin polymers do not contain a polymer fraction with a degree of branching less than or equal to 2 methyls/1000 carbons). The homogeneous ethylene/α-olefin polymers also do not contain ary highly short chain branched fraction (i.e., the homogeneous ethylene/α-olefin polymers do not contain a polymer fraction with a degree of branching equal to or more than 30 methyls/1000 carbons).

Both the substantially linear and the linear ethylene/α-olefin polymers are ethylene/α-olefin interpolymers having a short chain branching distribution index (SCBDI) greater than about 30 percent. Both the substantially linear and linear polymers have a single melting point, as opposed to traditional Ziegler polymerized polymers having two or more melting points (determined using differential scanning calorimetry (DSC)).

The substantially linear ethylene/α-olefin polymers are characterized as having:

a) a melt flow ratio, $I_{10}/I_2$, $\geq 5.63$,
b) a molecular weight distribution, Mw/Mn, defined by the equation; $M_w/M_n \leq (I_{10}/I_2) - 4.63$, and
c) a critical shear rate at onset of surface melt fracture of at least 50 percent greater than the critical shear rate at the onset of surface melt fracture of a linear olefin polymer having about the same $I_2$, and $M_w/M_n$.

The substantially linear ethylene/α-olefin polymer can also be characterized as having:

a) a melt flow ratio, $I_{10}$, $/I_2$, $\geq 5.63$,
b) a molecular weight distribution, $M_w/M_n$, defined by the equation: $M_w/M_n \leq (I_{10}/I_2) - 4.63$, and
c) a processing index (PI) less than or equal to about 70% of the PI of a linear olefin polymer having about the same 12 and $M_w/M_n$.

The linear and substantially linear ethylene/α-oletin interpolymer product samples are analyzed by gel permeation chromatography (GPC) on a Waters 150C high temperature chromatographic unit equipped with three mixed porosity columns (Polymer Laboratories $10^3$, $10_4$, $10_5$, and $10_6$), operating at a system temperature of 140°C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and word in *Journal of Polymer Science*, Polymer Letters, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = R\, w_i^* \, M_i$, where $W_i$ and $M_i$ are the weignt fraction and molecular weight, respectively, of the $i^{th}$ fraction elating from the GPC column.

For the linear and substantially linear ethylene/α-olefin polymers, the $M_w/M_n$ is preferably from about 1.5 to about 2.5.

The substantially linear ethylene/α-olefin polymers are made by using suitable constrained geometry catalysts. preferably constrained geometry catalysts as disclosed in U.S. Application Ser. Nos.: 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference. The monocyclopentadienyl transition metal olefin polymerization catalysts taught in USP 5,026,798, the teachings of which are incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane or modified methyl aluminoxane (made, e.g., as described in USP 5,041, 584, USP 4,544,762, USP 5,015,749, and/or USP 5,041,585, the disclosures of each of which are incorporated herein by reference) as well as inert, compatible, noncoordinating; ion forming compounds. Preferred, cocatalysts are inert, noncoordinating, boron compounds.

The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers of the present invention, such as those disclosed in USP 3,914,342, incorporated herein by reference. The multiple reactors can be operated in series or in parallel, with at least one constrained geometry catalyst employed in one of the reactors.

Component C) is present in the polymer composition of the present invention, in amounts of from 5, preferably from 10 and most preferably from 15 to 45, preferably to 40, and most preferably to 35 weight percent, based on the total weight of the polymer composition.

Optionally, the composition of the present invention can comprise an additional polyolefin, which is different from the polyolefin thermoplastic of A). For example, if A) is polypropylene, polyethylene may be optionally included. The polyethylene can be a high density polyethylene (HDPE) a low density polyethylene (LDPE), linear low density polyethylene (LLDPE) and the like. Preferably, the polyethylene is a HDPE. The amount of additional polyolefin used in the polymer composition of the present invention is typically from 0 to 20, generally from 1 to 20 weight percent based on the total weight of the polymer composition. If such additional polyolefin is used, it is added in substitution for a portion of A, B, or C, or any combination thereof.

Additionally, the polymer composition of the present invention can optionally contain inorganic filler silicon oxides, aluminum oxides, talc, calcium carbonate, mica, wollastonite, glass microspheres, glass fibers, mixtures thereof and the like. Preferred inorganic fillers include glass fibers, glass roving or chopped glass fibers having lengths from 0.1 to 10 millimeters and L/D from 5 to 100. Two such suitable glass fibers are available from Owens Corning Fiberglas under the designation OCF 187A$_{TM}$or 497$^{TM}$.

The amount of inorganic filler used in the polymer composition of the present invention is typically from 0 to 50 weight percent, preferably from 0 to 40, more preferably from 0 to 30 and most preferably from 0 to 20 weight percent, based on the total weight of the polymer composition.

Additionally, additives such as antioxidants, (e.g. hindered phenolics such as Irganox 1010, phosphites (e.g. Irgafos 168)), cling additives, antiblock additives, pigments, coupling agents, other fillers and the like can also be included in the compositions of the present invention to the extent that they do not interfere with the enhance properties discovered by applicants.

The formulations are compounded by any convenient method, including dry blending the individual components and subsequently melt mixing, either directly in the extruder used to make the finished article (e.g., the automotive part), or by pre-melt mixing in a separate extruder (e.g., a Banbury mixer).

There are many types of molding operations which can be used to form useful fabricated articles or parts from compositions disclosed herein, including various injection molding processes (e.g., that described in *Modern Plastics Encyclopedia*/89, Mid Oct. 1988 Issue, Volume 65, Number 11, pp. 264–268, "Introduction to Injection Molding" and on pp. 270–271, "Injection Molding Thermoplastics", and blow molding processes (e.g., that described in *Modern Plastics Encyclopedia*/89, Mid Oct. 1988 Issue, Volume 65, Number 11, pp. 217–218, "Extrusion-Blow Molding", and profile extrusion. Examples of fabricated articles include automotive bumpers, facia, wheel covers and grilles, as well as other household and personal articles, including, for example, freezer containers.

In one embodiment, the composition of the present invention comprises:

A) a polyolefin thermoplastic,

B) a hydrogenated block copolymer of a vinyl aromatic and conjugated diene monomer having a level of aromatic hydrogenation of at least 70 percent, and C) at least one linear or substantially linear ethylene/α-olefin polymer, wherein the total weight of A), B), and C) is generally at least 90 weight percent, typically, at least 95, preferably at least 98, more preferably at least 99, even more preferably at least 99.5 and most preferably 100 weight percent, based on the total weight of the composition.

In another embodiment, the composition of the present invention comprises;

A) a polypropylene resin,

B) a hydrogenated block copolymer of a vinyl aromatic and conjugated diene monomer having a level of aromatic hydrogenation of at least 70 percent, and C) at least one linear or substantially linear ethylene/α-olefin polymer.

The compositions of the present invention have improved flow, stiffness and impact resistance balance which can find use in many applications such as molded parts and extruded profiles and automotive interior and exterior parts.

The following examples are provided to illustrate the present invention. The examples are not intended to limit the scope of the present invention ard they should not be so interpreted. Amounts are in weight parts or weight percentages unless otherwise indicated.

EXAMPLES 1–2

The components listed in Table 1 are tumble blended for approximately 1 minute until a homogeneous mixture is obtained. The mixtures are extruded at 200° C. and 250 rpm in a 30 mm welding Engineers twin screw extruder. The compounded mixtures and a polypropylene/acrylic alloy control sample are then injection molded at 200° C. into ASTM tensile bars and 4" (9.16 cm) diameter disks using a Toyo injection molding machine and a 60° C. mold temperature. Physical property testing is done in accordance with ASTM methods as indicated below.

Melt Flow Rate ASTM D-1238 (L)
Specific Gravity ASTM D-792
Flexural Modulus ASTM D-790
Notched Izod ASTM D-256
DTUL (HDT) ASTM D-648

TABLE 1

| Ingredients | Comp. Ex. 1 | Ex. 1 | Comp. Ex. 2 | Ex. 2 | Control[6] |
|---|---|---|---|---|---|
| A) Polypropylene[1] | 50 | 25 | 45 | 22.5 | — |
| A) Ethylene/Propylene Copolymer[5] | 20 | 20 | 25 | 25 | — |
| B) Hydrogenated Block Copolymer[2] | | 25 | | 22.5 | — |

TABLE 1-continued

| Ingredients | Comp. Ex. 1 | Ex. 1 | Comp. Ex. 2 | Ex. 2 | Control[6] |
|---|---|---|---|---|---|
| C) Ethylene-Octene Rubber #1[3] | 15 | 15 | 15 | 15 | — |
| C) Ethylene-Octene Rubber #2[4] | 15 | 15 | 15 | 15 | — |
| ASTM Prop. | | | | | |
| MFR at 230° C./2.16 kg, g/10 min | 21.0 | 17. | 21.4 | 18.1 | 3.2 |
| Specific Gravity | 0.897 | 0.9 | 0.900 | 0.89 | 0.937 |
| Flexural Modulus, Mps | 1265 | 116 | 1230 | 1222 | 1449 |
| Notched Izod at 23° C., J/m | 529 | 593 | 641 | 593 | 924 |
| Notched Izod at 0° C., J/m | 75 | 523 | 69 | 518 | 475 |
| Notched Izod at –18° C., J/m | 43 | 422 | 48 | 417 | 32 |
| Notched Izod at –29° C., J/m | 32 | 53 | 32 | | 16 |

[1]available from Amoco under the designation Amoco 9934
[2]hydrogenated block copolymer is a styrene-butadiene-styrene pentablock copolymer having a total Mn or 60,000, and a hydrogenated styrene content of 85 wt. percent.
[3]EO Rubber #1 is Affinty 8180 ™ (0.863 density)
[4]EO Rubber #2 is Affinty 8200 ™ (0.870 density)
[5]ARISTECH ™ T15600M
[6]Polypropylene/Acrylic Alloy Control Sample is appproximately 85% thermoplastic polyolefin and 15% polymethylmethacrylate (PMMA) by weight.

Compositions containing the hydrogenated block copolymer have significantly improved Izod impact values.

EXAMPLES 3–8

Blends are prepared with the compositions given in Table 2. Pellets of the materials are dry blended, compounded in a single screw extruder, and the test specimens injection moldqd. Notched Izod impact results at -29° C. and tensile modulus at 23° C. are determined.

TABLE 2

| Ex. | Polypropylene[1] | Polyolefin Elastomer[2] | Hydrog. Block Copolymer | Izod[4] (J/m) | Tensile Modulus[5] (Gpa) |
|---|---|---|---|---|---|
| 3 | 75 | 20 | 5[3] | 27 | 1.44 |
| 4 | 55 | 40 | 5[3] | 496 | 0.85 |
| 5 | 75 | 23 | 2[3] | 32 | 1.37 |
| 6 | 55 | 43 | 2[3] | 763 | 0.88 |
| 7 | 70 | 25 | 5* | 21 | 1.41 |
| 8 | 50 | 45 | 5* | 571 | 0.86 |

[1]available from Amoco under the designation Amoco 9934
[2]A 50/50 blend of AFFINITY ™ 8180/8200 available from the Dow Chemical Company.
[3]A fully hydrogenated styrene-butadiene-styrene triblock copolymer having Mn of 100,000 and 20 percent hydrogenated styrene content.
*A fully hydrogenated styrene-butadiene-styrene pentablock copolymer having Mn of 60,000 and 85 percent hydrogenated styrene content.
[4]ASTM method D-256
[5]ASTM method D-638

What is claimed is:

1. A composition comprising:

A) a polyolefin thermoplastic,

B) a hydrogenated block copolymer of a vinyl aromatic and conjugated diene monomer having a level of aromatic hydrogenation of at least 70 percent, and C) at least one linear or substantially linear ethylene/α-olefin polymer.

2. The composition of claim 1, wherein the polyolefin of A) is polypropylene or an ethylene-propylene copolymer.

3. The composition of claim 1, wherein the polyolefin of A) is a combination of polypropylene and an ethylene-propylene copolymer.

4. The composition of claim 2 or 3, wherein the ethylene-propylene copolymer contains from 5 to 20 percent ethylene and from 80 to 95 percent propylene.

5. The composition of claim 1, wherein the polyolefin of A) is present in an amount of from 30 to 75 weight percent, based on the total weight of the composition.

6. The composition of claim 1, wherein the hydrogenated block copolymer is a hydrogenated styrene-butadiene block copolymer.

7. The composition of claim 1, wherein the composition comprises from 1 to 45 weight percent of the hydrogenated block copolymer of B), based on the total weight of the composition.

8. The composition of claim 1, wherein the ethylene/α-olefin polymer is selected from the group consisting of homopolymers of α-olefins, ethylene/propylene, ethylene/1-butene, ethylene/1-hexene, ethylene/1-octene copolymers, a terpolymer of ethylene, propylene and hexadiene, a terpolymer of ethylene, propylene and ethylidenenorbornene and grafted derivatives thereof.

9. The composition of claim 8, wherein the ethylene/α-olefin polymer is ethylene/1-octene copolymer.

10. The composition of claim 1, wherein the ethylene/α-olefin polymer is present in an amount of from 5 to 45 weight percent, based on the total weight of the composition.

11. The composition of claim 1 additionally comprising a second polyolefin, which is different from the polyolefin thermoplastic of A).

12. The composition of claim 11, wherein the second polyolefin is high density polyethylene.

13. The composition of claim 12, wherein the amount of high density polyethylene is from 1 to 20 weight percent based on the total weight of the polymer composition.

* * * * *